United States Patent [19]
Brown et al.

[11] Patent Number: 5,041,504
[45] Date of Patent: Aug. 20, 1991

[54] POLYPHENYLENE ETHER-POLYAMIDE COPOLYMERS FROM EPOXYTRIAZINE-CAPPED POLYPHENYLENE ETHERS

[75] Inventors: Sterling B. Brown, Schenectady, N.Y.; John S. Trent; Joseph C. Golba, Jr., both of Evansville, Ind.; Richard C. Lowry, Lansdale, Pa.

[73] Assignee: General Electric Company, Schenectady, N.Y.

[21] Appl. No.: 373,079

[22] Filed: Jun. 29, 1989

Related U.S. Application Data

[63] Continuation-in-part of Ser. No. 286,184, Dec. 19, 1988, abandoned.

[51] Int. Cl.$^5$ .................. C08L 63/00; C08L 71/12; C08L 77/02
[52] U.S. Cl. ........................ 525/396; 525/68; 525/148; 525/152; 525/183; 525/185; 525/397; 525/905; 528/87
[58] Field of Search ................ 525/396, 397

[56] References Cited

U.S. PATENT DOCUMENTS 4,732,937 3/1988 Sybert .
4,895,945 1/1990 Brown et al. ................ 544/218

Primary Examiner—Jacob Ziegler
Attorney, Agent, or Firm—William H. Pittman; James C. Davis, Jr.

[57] ABSTRACT

Copolymer-containing compositions are prepared by the reaction of an epoxytriazine-capped polyphenylene ether with another polymer containing amine end groups, especially a polyamide, under intimate blending conditions. The compositions have excellent properties and find utility as molding compositions and as compatibilizers for blends of similar polymers. Suitable epoxytriazine-capped polyphenylene ethers may be prepared by reaction of a polyphenylene ether with an epoxychlorotriazine such as diglycidyl chlorocyanurate, n-butyl glycidyl chlorocyanurate or mesityl glycidyl chlorocyanurate.

9 Claims, No Drawings

POLYPHENYLENE ETHER-POLYAMIDE COPOLYMERS FROM EPOXYTRIAZINE-CAPPED POLYPHENYLENE ETHERS

This application is a continuation-in-part of copending application Ser. No. 286,184, filed Dec. 19, 1988, now abandoned.

This invention relates to the preparation of polyphenylene ether-polyamide copolymers.

The polyphenylene ethers are a widely used class of thermoplastic engineering resins characterized by excellent hydrolytic stability, dimensional stability, toughness, heat resistance and dielectric properties. However, they are deficient in certain other properties such as workability and solvent resistance. Therefore, there is a continuing search for means for modifying polyphenylene ethers to improve these other properties.

A disadvantage of the polyphenylene ethers which militates against their use for molding such items as automotive parts is their low resistance to non-polar solvents such as gasoline. For increased solvent resistance, it would be desirable to form compositions in which polyphenylene ethers are combined with resins which have a high degree of crystallinity and therefore are highly resistant to solvents. Illustrative of such resins are the thermoplastic polyamides. Other reasons exist for forming compositions comprising polyphenylene ethers and such other polyamides as the amorphous species.

However, polyphenylene oxide-polyamide blends frequently undergo phase separation and delamination. They typically contain large, incompletely dispersed polyphenylene ether particles and no phase interaction between the two resin phases. Molded parts made from such blends are typically characterized by extremely low impact strength, brittleness, delamination and the like.

Numerous methods for compatibilizing polyphenylene ether-polyamide compositions have been developed. For example, U.S. Pat. Nos. 4,315,086 and copending, commonly owned application Ser. No. 736,489, filed May 20, 1985, describe the use for this purpose of various polyfunctional compounds, including olefinic and acetylenic carboxylic acids, polycarboxylic acids and functional derivatives thereof.

A very effective way of compatibilizing polyphenylene ether-polyamide compositions is by the formation of a copolymer of the two resins. This may be achieved by the incorporation of a polyamide-reactive functional group on the polyphenylene ether. Groups suitable for this purpose include carboxylic acid groups as in U.S. Pat. Nos. 4,600,741 and 4,732,938 and copending, commonly owned application Ser. No. 885,497, filed July 14, 1986.

Another particularly suitable polyamide-reactive functional group is the epoxy group. Various methods of attaching epoxy groups to polyphenylene ethers have been disclosed. For example, U.S. Pat. No. 4,460,743 describes the reaction of a polyphenylene ether with epichlorohydrin, to produce an epoxy-functionalized polymer. However, this method requires dissolution of the polyphenylene ether in a large excess of epichlorohydrin, a relatively expensive reagent which is also a strong skin irritant and can cause kidney injury.

U.S. Pat. No. 4,732,937 describes the reaction of polyphenylene ethers with terephthaloyl chloride and glycidol to form an epoxy-functionalized polyphenylene ether useful for the preparation of copolymers with polyamides. However, this reaction is relatively slow and requires a plurality of steps which must be conducted in solution.

According to copending, commonly owned application Ser. No. 912,705, filed Sept. 29, 1986, various epoxy-functionalized ethylenic monomers such as glycidyl acrylate, glycidyl methacrylate and allyl glycidyl ether are caused to react with polyphenylene ethers in the presence of free radical initiators. The resulting epoxy-functionalized materials are useful as intermediates for the preparation of copolymers by melt reaction with polyamides. However, functionalization of the polyphenylene ether by this method most often requires large quantities of the monomer, and certain of such monomers, including glycidyl methacrylate, are toxic. Moreover, the reaction is generally accompanied by homopolymerization of the epoxy-functionalized monomer, and it is then necessary to remove the homopolymer by such complicated operations as dissolution of the crude polymeric product followed by formation and decomposition of a polyphenylene ether-methylene chloride complex. Thus, these materials may not be readily adaptable to copolymer preparation on an industrial scale.

The present invention provides compositions comprising polyphenylene ether-polyamide copolymers formed from highly reactive epoxy-functionalized polyphenylene ethers which may be prepared under simple solution or interfacial conditions using relatively inexpensive reagents. Said compositions have excellent physical properties, particularly when blended with conventional impact modifiers for polyphenylene ethers. They also compatibilize blends containing unfunctionalized polyphenylene ethers.

Accordingly, one aspect of the invention is a method for preparing a composition comprising polyphenylene ether copolymers which comprises effecting reaction under intimate blending conditions between an epoxytriazine-capped polyphenylene ether and at least one other polymer containing amine end groups. Another aspect of the invention is compositions prepared by said method.

Epoxytriazine-capped polyphenylene ethers suitable for use in the preparation of the compositions of this invention, as well as methods for their preparation, are disclosed and claimed in copending, commonly owned application Ser. No. 210,547, filed June 23, 1988. They comprise polymer molecules having end groups of the formula

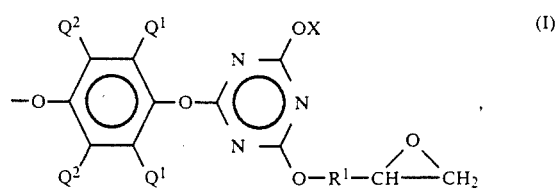

wherein:

each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms;

each $Q^2$ is independently hydrogen, halogen, primary or secondary lower alkyl, phenyl, haloalkyl, hydrocarbonoxy or halohydrocarbonoxy as defined for $Q^1$;

X is an alkyl, cycloalkyl or aromatic radical or

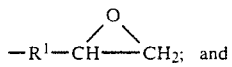 (II)

$R^1$ is a divalent aliphatic, alicyclic, heterocyclic or unsubstituted or substituted aromatic hydrocarbon radical.

Said epoxytriazine-capped polyphenylene ethers may be prepared as described hereinafter from the polyphenylene as ethers known in the art. The later encompass numerous variations and modifications all of which are applicable to the present invention, including but not limited to those described hereinafter.

The polyphenylene ethers comprise a plurality of structural units having the formula

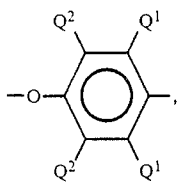 (III)

and in each of said units independently, each $Q^1$ and $Q^2$ is as previously defined. Examples of primary lower alkyl groups suitable as $Q^1$ and $Q^2$ are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent, provided substantial proportions of free hydroxy groups remain present. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

The polyphenylene ethers which may be employed for the purposes of this invention include those which comprise molecules having at least one of the end groups of the formulas

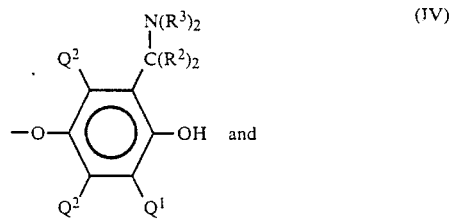 (IV)

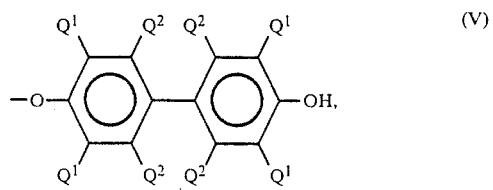 (V)

wherein $Q^1$ and $Q^2$ are as previously defined; each $R^2$ is independently hydrogen or alkyl, with the proviso that the total number of carbon atoms in both $R^2$ radicals is 6 or less; and each $R^3$ is independently hydrogen or a $C_{1-6}$ primary alkyl radical. Preferably, each $R^2$ is hydrogen and each $R^3$ is alkyl, especially methyl or n-butyl.

Polymers containing the aminoalkyl-substituted end groups of formula IV are typically obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

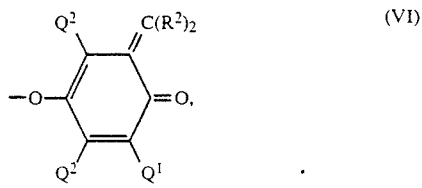

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula V are often especially useful in the present invention. They are typically obtained from reaction mixtures in which a by-product diphenoquinone of the formula

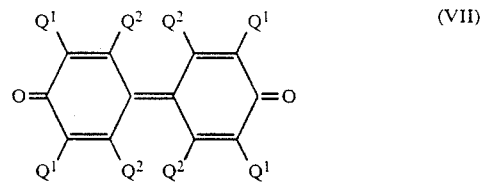

is present, especially in a copper-halide-secondary or tertiary amine system. In this regard, the disclosure of U.S. Pat. No. 4,477,649 is again pertinent as are those of U.S. Pat. No. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas IV and V. It should be understood, however, that other-end groups may be present and that the invention in its broadest sense may not be dependent on the molecular structures of the polyphenylene ether end groups. It is, however, required that a substantial proportion of free, non-hydrogen bonded hydroxy groups be present; that is, that a substantial proportion of hydroxy-terminated end groups have structures other than that of formula IV.

The use of polyphenylene ethers containing substantial amounts of unneutralized amino nitrogen may afford compositions with undesirably low impact strengths. The possible reasons for this are explained hereinafter. The amino compounds include, in addition to the aforementioned aminoalkyl end groups, traces of amine (particularly secondary amine) in the catalyst used to form the polyphenylene ether.

The present invention therefore includes the use of polyphenylene ethers in which a substantial proportion of amino compounds has been removed or inactivated. Polymers so treated contain unneutralized amino nitrogen, if any, in amounts no greater than 800 ppm. and more preferably in the range of about 100-800 ppm.

A preferred method of inactivation is by extrusion of the polyphenylene ether at a temperature within the range of about 230°-350° C., with vacuum venting. This is preferably achieved in a preliminary extrusion step, by connecting the vent of the extruder to a vacuum pump capable of reducing the pressure to about 200 torr or less. There may also be advantages in employing vacuum venting during extrusion of the composition of this invention.

It is believed that this inactivation method aids in the removal by evaporation of any traces of free amines (predominantly secondary amines) in the polymer, including amines generated by conversion of aminoalkyl end groups to quinone methides of the type represented by formula VI.

It will be apparent to those skilled in the art from the foregoing that the polyphenylene ethers contemplated for use in the present invention include all those presently known, irrespective of variations in structural units or ancillary chemical features.

The end groups on the epoxytriazine-capped polyphenylene ethers have formula I, in which $Q^1$ and $Q^2$ are as previously defined. X may be an alkyl or cycloalkyl radical, typically lower alkyl and especially primary or secondary lower alkyl; an aromatic radical, typically monocyclic and containing 6-10 carbon atoms and especially an aromatic hydrocarbon radical; or a radical of formula II. In formulas I and II, $R^1$ may be aliphatic, alicyclic, aromatic (including aromatic radicals containing art-recognized substituents) or heterocyclic. It is usually lower alkylene and especially methylene.

The above-described epoxytriazine-capped polyphenylene ether compositions may be prepared by contacting under reactive conditions, in the presence of a basic reagent, at least one polyphenylene ether with an epoxychlorotriazine of the formula

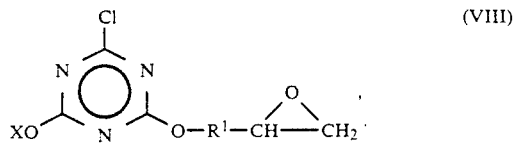

wherein $R^1$ and X are as previously defined.

Typical epoxychlorotriazines of formula VIII include 2-chloro-4,6-diglycidoxy-1,3,5-triazine (hereinafter "DGCC"), 2-chloro-4-methoxy-6-glycidoxy-1,3,5-triazine, 2-chloro-4-(n-butoxy)-6-glycidoxy-1,3,5-triazine (hereinafter "BGCC") and 2-chloro-4-(2,4,6-trimethylphenoxy)-6-glycidoxy-1,3,5-triazine (hereinafter "MGCC"). These compounds may also be named as though derived from cyanuric acid and DGCC, BGCC and MGCC may be designated diglycidyl chlorocyanurate, n-butyl glycidyl chlorocyanurate and 2,4,6-trimethylphenyl glycidyl chlorocyanurate, respectively. They may be prepared, for example, by the reaction of 2,4,6-trichlorotriazine (cyanuric chloride) with glycidol or combinations thereof with n-butanol or mesitol. Cyanuric chloride and n-butyl dichlorocyanurate are both commercially available.

Intermediates such as DGCC, BGCC and MGCC and the method for their preparation are disclosed and claimed in copending, commonly owned application Ser. No. 144,901, filed Jan. 19, 1988. Their preparation is illustrated by the following examples.

EXAMPLE 1

To a mechanically stirred solution of 220.8 g. (1.2 moles) cyanuric chloride in 1500 ml. chloroform, cooled to 0–10° C., was added 266.4 g. (3.6 moles) glycidol in one portion. Aqueous sodium hydroxide (50% solution; 192 g.) was added to the mixture dropwise with stirring over about 3 hours maintaining the reaction temperature below 10° C. and preferably around 0°–5° C. The reaction mixture was allowed to warm slowly to room temperature. The chloroform layer was washed with distilled water until neutral and dried over magnesium sulfate. The reaction product was found by carbon-13 nuclear magnetic resonance to be 2-chloro-4,6-diglycidoxy-1,3,5-triazine (DGCC). Analysis by liquid chromatography showed about 95% (by weight) chlorodiglycidoxytriazine. The reaction mixture also was found to contain small amounts of triglycidoxytriazine and dichloroglycidoxytriazine.

EXAMPLE 2

To a magnetically stirred solution of 250 g. (1.125 moles) n-butyl dichlorocyanurate in 757 ml. chloroform, cooled to 0°–10° C., was added 250 g. (3.375 moles) glycidol in one portion. Aqueous sodium hydroxide (50% solution; 90 g.) was added to the mixture dropwise with stirring over about 2 hours, maintaining the reaction temperature below 10° C. and preferably around 0°–5° C. The reaction mixture was allowed to warm to room temperature over 30 minutes. The chloroform layer was washed with distilled water until neutral and dried over magnesium sulfate. Proton nuclear magnetic resonance analysis indicated a 95% yield of 2-chloro-4-(n-butoxy)-6-glycidoxy-1,3,5-triazine (BGCC).

EXAMPLE 3

To a mechanically stirred solution of 50 g. (0.175 mole) 2,4,6-trimethylphenyl dichlorocyanurate (prepared by the reaction of equimolar amounts of mesitol and cyanuric chloride) in 170 ml. methylene chloride, cooled to 0°–10° C., was added 26.38 g. (0.356 mole) glycidol in one portion. Aqueous sodium hydroxide (50% solution; 14.26 g.) was added to the mixture dropwise with stirring over about 25 minutes maintaining the reaction temperature between 0° and 10° C. and preferably around 0°–5° C. After stirring an additional 30 minutes, the reaction mixture was allowed to warm to room temperature. The methylene chloride layer was washed with distilled water until neutral and dried over magnesium sulfate. The reaction product was found by proton nuclear magnetic resonance to be 2-chloro-4-(2,4,6-trimethylphenoxy)-6-glycidoxy-1,3,5-triazine (MGCC).

Various options are available for the reaction of the polyphenylene ether with the epoxychlorotriazine. In one method, the reaction is conducted in solution in a non-polar organic liquid, typically at a temperature in the range of about 80–150° C. and preferably about 100°–125° C. The basic reagent employed in this method should be soluble in the organic liquid and is generally a tertiary amine. Its identity is not otherwise critical, provided it is sufficiently nonvolatile to remain in the reaction mixture at the temperatures employed. Pyridine is often preferred.

The amount of epoxychlorotriazine employed in this option is generally in the range of about 1–20% by weight, based on polyphenylene ether. The amount of basic reagent is an effective amount to promote the reaction; in general, about 1.0–1.1 equivalent thereof per mole of chloroepoxytriazine is adequate.

The epoxytriazine-capped polyphenylene ethers made in solution by the above-described process are generally found to contain rather high proportions (e.g., at least about 0.4% by weight) of chemically combined chlorine, principally covalently bound. It is believed that the covalently bound chlorine is the result of epoxy groups competing with the organic base as a hydrogen chloride acceptor, with the formation of chlorohydrin moieties. This may be followed by condensation of said chlorohydrin moieties with additional epoxy groups to produce such molecular species as polyphenylene ether-epoxytriazine block copolymers and homopolymeric epoxytriazine oligomers.

Upon molding, compositions containing polyphenylene ether copolymers prepared from products containing such species form articles which are ductile but have impact strengths somewhat lower than desired under certain conditions. This is particularly true of copolymers with polyesters.

A second, preferred method of preparation produces epoxytriazine-capped polyphenylene ethers with little or no covalently bound chlorine. In this method, the reaction is conducted interfacially in a medium comprising water and an organic liquid as previously described. The basic reagent is a water-soluble base, typically an alkali metal hydroxide and preferably sodium hydroxide. It may added to the mixture of epoxychlorotriazine and polyphenylene ether, or may initially react with the polyphenylene ether to form a salt which is then contacted with the epoxychlorotriazine There is also employed a phase transfer catalyst. Any of such catalysts which are stable and effective under the prevailing reaction conditions may be used; those skilled in the art will readily perceive which ones are suitable. Particularly preferred are the tetraalkylammonium chlorides wherein at least two alkyl groups per molecule, typically 2 or 3, contain about 5–20 carbon atoms.

In this method, reaction temperatures in the range of about 20°–100° C. may be employed. The amount of epoxychlorotriazine is frequently lower than in the previously described method, typically in the range of about 1–6% and preferably about 2–6% by weight based on polyphenylene ether, since the reaction of the epoxychlorotriazine with the polyphenylene ether apparently proceeds more nearly to completion. Most often, the ratio of equivalents of base to moles of epoxychlorotriazine is about 0.5–1.5:1 and the weight ratio of phase transfer catalyst to polyphenylene ether is about 0.01–5.0:1.

Still another method utilizes an organic liquid and a solid base, typically a solid alkali metal hydroxide or an anion exchange resin in the free base form. Chloride salts may be removed by methods known in the art, including water washing when a hydroxide is employed and filtration when an anion exchange resin is employed.

Regardless of which method of preparation is used, the epoxytriazine-capped polyphenylene ether may be isolated by conventional methods, typically by precipitation with a non-solvent. Among the non-solvents which may be employed are methanol, 1-propanol, acetone, acetonitrile and mixtures thereof.

When the non-solvent is an alcohol, and especially methanol, it may undergo base-promoted reaction with the epoxytriazine moieties on the capped polyphenylene ether, usually resulting in a loss of epoxide groups. Either or both of two operations may be employed to suppress this reaction. The first is to neutralize the reaction mixture with any convenient acidic compound; carbon dioxide, in gaseous, liquid or solid form, is often preferred. The second is to remove alcohol from contact with the product as rapidly and completely as possible by conventional means, typically including a subsequent drying step.

In the following examples which illustrate the preparation of epoxytriazine-capped polyphenylene ethers, proportions of epoxychlorotriazine are expressed as a percentage of polyphenylene ether. The following polyphenylene ethers were employed:

PPE - a poly(2,6-dimethyl-1,4-phenylene ether) having an intrinsic viscosity in chloroform at 25° C. of 0.40 dl./g.

VV - PPE which had been extruded on a twin screw extruder within the temperature range of about 260°–320° C., with vacuum venting to a maximum pressure of about 20 torr.

LN - a poly(2,6-dimethyl-1,4-phenylene ether) having an intrinsic viscosity of 0.57 dl./g., having a low proportion of nitrogen as a result of preparation with a catalyst containing no primary or secondary amine.

Percentages of epoxytriazine in the capped polymer were determined from the relative areas of peaks in the nuclear magnetic resonance spectrum attributable to hydrogen atoms in the epoxy and aromatic moieties. Chlorine percentages were determined by quantitative X-ray fluorescence.

EXAMPLES 4–14

To solutions of 400 grams of polyphenylene ether in 2500 ml. of toluene were added, with stirring, various quantities of pyridine followed by various quantities of epoxychlorotriazines, added in portions. The ratio of equivalents of pyridine to moles of epoxychlorotriazine was 1.04:1. The solutions were heated under reflux for various periods of time, after which the products were precipitated with methanol in a blender, filtered, washed with methanol and vacuum dried. The relevant parameters and analytical results are given in Table I.

TABLE I

| Example | Polyphenylene ether | Epoxychlorotriazine Identity | % | Reaction time, hrs. | % epoxytriazine | % chlorine |
|---|---|---|---|---|---|---|
| 4 | PPE | DGCC | 5 | 2 | 0.52 | — |
| 5 | PPE | DGCC | 5 | 3 | 0.62 | — |
| 6 | VV | DGCC | 5 | 1 | 0.43 | 0.42 |
| 7 | VV | DGCC | 5 | 2 | 0.65 | — |
| 8 | VV | DGCC | 5 | 3 | 0.63 | 0.47 |
| 9 | VV | DGCC | 2.5 | 3.5 | 0.24 | — |
| 10 | VV | DGCC | 15 | 3 | 2.1 | 1.8 |
| 11 | VV | DGCC | 15 | 3 | 1.9 | — |
| 12 | VV | BGCC | 5 | 3 | 0.50 | — |
| 13 | VV | BGCC | 5 | 3 | 0.40 | — |
| 14 | VV | BGCC | 15 | 3 | 1.79 | — |

EXAMPLES 15–25

To solutions of 400 grams of polyphenylene ether in 2500 ml. of toluene were added various quantities of epoxychlorotriazines dissolved in a small amount of methylene chloride. There were then added 48 grams of a 10% solution in toluene of a commercially available methyltrialkylammonium chloride in which the alkyl groups contained 8–10 carbon atoms, and 10% aqueous sodium hydroxide solution in the amount of 1.3 equivalents of sodium hydroxide per mole of epoxychlorotriazine. The mixtures were stirred vigorously for various periods at 25°–40° C., after which the products were precipitated with methanol in a blender and rapidly filtered, washed with methanol and vacuum dried.

The results are given in Table II. Chlorine proportions were less than 200 ppm., the minimum detectable by quantitative X-ray fluorescence.

TABLE II

| Example | Polyphenylene ether | Epoxychlorotriazine Identity | % | Reaction time, min. | % epoxytriazine |
|---|---|---|---|---|---|
| 15 | PPE | DGCC | 1.5 | 30 | 0.52 |
| 16 | PPE | DGCC | 2.0 | 30 | 1.03 |
| 17 | PPE | DGCC | 2.5 | 30 | 0.95 |
| 18 | PPE | DGCC | 3.0 | 30 | 0.96 |
| 19 | PPE* | DGCC | 3.0 | 30 | 1.01 |
| 20** | PPE | DGCC | 3.0 | 30 | 1.24 |
| 21 | LN | DGCC | 3.0 | 30 | 0.48 |
| 22 | PPE | DGCC | 5.0 | 30 | 1.40 |
| 23 | VV | DGCC | 5.0 | 10 | 0.68 |
| 24 | PPE | BGCC | 3.0 | 30 | 1.25 |
| 25 | PPE | MGCC | 3.0 | 30 | 1.50*** |

*16% slurry of crude PPE in toluene.
**Reaction mixture neutralized with gaseous carbon dioxide.
***Average of 3 runs.

Any polymer (other than a polyphenylene ether) containing amine end groups may be employed in the present invention. Polyamides are particularly preferred. Included are those prepared by the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above together with substantially equimolar proportions of a diamine and a dicarboxylic acid. (The term "substantially equimolar" proportions includes both strictly equimolar proportions and slight departures therefrom which are involved in conventional techniques for stabilizing the viscosity of the resultant polyamides.) The dicarboxylic acid may be used in the form of a functional derivative thereof, for example, an ester or acid chloride.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring containing the —CO—NH— group in the case of a lactam. As particular examples of aminocarboxylic acids and lactams there may be mentioned ε-aminocaproic acid, butyrolactam, pivalolactam, ε-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

The dicarboxylic acids may be represented by the formula

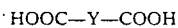
HOOC—Y—COOH wherein Y is a divalent aliphatic or aromatic group containing at least 2 carbon atoms. Examples of aliphatic acids are sebacic acid, octadecanedioic acid, suberic acid, glutaric acid, pimelic acid and adipic acid.

Both crystalline and amorphous polyamides may be employed, with the crystalline species often being preferred by reason of their solvent resistance. Typical examples of the polyamides or nylons, as these are often called, include, for example, polyamide-6 (polycaprolactam), 66 (polyhexamethylene adipamide), 11, 12, 63, 64, 6/10 and 6/12 as well as polyamides from terephthalic acid and/or isophthalic acid and trimethylhexamethylenediamine; from adipic acid and m-xylylenediamines; from adipic acid, azelaic acid and 2,2-bis(p-aminophenyl)propane or 2,2-bis-(p-aminocyclohexyl)propane and from terephthalic acid and 4,4'-diaminodicyclohexylmethane. Mixtures and/or copolymers of two or more of the foregoing polyamides or prepolymers thereof, respectively, are also within the scope of the present invention. Preferred polyamides are polyamide-6, 46, 66, 11 and 12, most preferably polyamide-66.

For the preparation of copolymer compositions according to this invention, a blending method which results in the formation of an intimate blend is required. Suitable procedures include solution blending, although such procedures are of limited applicability to many polyamides by reason of their insolubility in most common solvents. For this reason and because of the availability of melt blending equipment in commercial polymer processing facilities, melt reaction procedures are generally preferred. Conventional melt blending procedures and equipment may be employed, with extrusion often preferred because of its relative convenience and particular suitability. Typical reaction temperatures are in the range of about 175°–350° C.

The necessity for intimate blending is particularly strong when the epoxytriazine-capped polyphenylene ether is one in which X has formula II; that is, in the case of diepoxide-capped polymers. It is still stronger when a "low chlorine" capped polymer, as described hereinabove, is employed. In those cases, such properties as impact strength may be adversely affected by less than extremely efficient blending methods.

Those skilled in the art will be familiar with blending methods and apparatus capable of intimately blending resinous constituents, especially by kneading. They are exemplified by disc-pack processors and various types of extrusion equipment. Illustrations of the latter are continuous mixers; single screw kneading extruders; counterrotating, non-intermeshing twin screw extruders having screws which include forward-flighted compounders, cylindrical bushings and/or left-handed screw elements; corotating, intermeshing twin screw extruders; and extruders having screws which include at least one and preferably at least two sections of kneading block elements. As previously mentioned, vacuum venting may also be advantageous at this stage.

It is within the scope of the invention to include in the blending step elastomeric impact modifiers compatible with either or both of the polyphenylene ether and the polyamide.

Impact modifiers for polyphenylene ether-polyamide compositions are well known in the art. They are typically derived from one or more monomers selected from the group consisting of olefins, vinyl aromatic monomers, acrylic and alkylacrylic acids and their ester derivatives as well as conjugated dienes. Especially preferred impact modifiers are the rubbery high-molecular weight materials including natural and synthetic polymeric materials showing elasticity at room temperature. They include both homopolymers and copolymers, including random, block, radial block, radial block, graft and core-shell copolymers as well as combinations thereof.

Polyolefins or olefin-based copolymers employable in the invention include low density polyethylene, high density polyethylene, linear low density polyethylene, isotactic polypropylene, poly(1-butene), poly(4-methyl-1-pentene), propylene-ethylene copolymers and the like. Additional olefin copolymers include copolymers of one or more α-olefins, particularly ethylene, with copolymerizable monomers including, for example, vinyl acetate, acrylic acids and alkylacrylic acids as well as the ester derivatives thereof including, for example, acrylic acid, ethyl acrylate, methacrylic acid, methyl methacrylate and the like. Also suitable are the ionomer resins, which may be wholly or partially neutralized with metal ions.

A particularly useful class of impact modifiers are those derived from the vinyl aromatic monomers. These include AB and ABA type block and radial block copolymers and vinyl aromatic conjugated diene core-shell graft copolymers.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylenepropylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254; 3,402,159; 3,297,793; 3,265,765 and 3,594,452 and UK Pat. No. 1,264,741, all incorporated herein by reference. Examples of typical species of AB block copolymers include:
  polystyrene-polybutadiene (SBR),
  polystyrene-polyisoprene and ha-methylstyrene)-polybutadiene.

Such AB block copolymers are available commercially from a number of sources, including Phillips Petroleum under the trademark SOLPRENE.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference.

Examples of triblock copolymers include:
polystyrene-polybutadiene-polystyrene (SBS),
polystyrene-polyisoprene-polystyrene (SIS),
poly(α-methylstyrene)-polybutadiene-poly(α-methylstyrene) and
poly(α-methylstyrene)-polyisoprene-poly(α-methylstyrene).

Particularly preferred triblock copolymers are available commercially as CARIFLEX ®, KRATON D ® and KRATON G ® from Shell.

Another class of impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, isoprene-isobutylene copolymers, chlorobutadiene polymers, butadiene-acrylonitrile copolymers, polyisoprene, and the like. Ethylene-propylene-diene monomer rubbers may also be used. These EPDM's are typified as comprising predominantly ethylene units, a moderate amount of propylene units and up to about 20 mole percent of non-conjugated diene monomer units. Many such EPDM's and processes for the production thereof are disclosed in U.S. Pat. Nos. 2,933,480; 3,000,866; 3,407,158; 3,093,621 and 3,379,701, incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkenylarene and/or acrylic monomers alone or, preferably, in combination with other vinyl monomers. Such core-shell copolymers are widely available commercially, for example, from Rohm and Haas Company under the trade names KM-611, KM-653 and KM-330, and are described in U.S. Pat. Nos. 3,808,180; 4,034,013; 4,096,202; 4,180,494 and 4,292,233.

Also useful are the core-shell copolymers wherein an interpenetrating network of the resins employed characterizes the interface between the core and shell. Especially preferred in this regard are the ASA type copolymers available from General Electric Company and sold as GELOY ™ resin and described in U.S. Pat. No. 3,944,631.

In addition, there may be employed the above-described polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, ethylene-propylene rubber, thermoplastic polyester elastomers and thermoplastic ether-ester and ether-amide elastomers.

The proportion of impact modifier or other resinous material is subject to wide variation. Impact modifiers such as diblock or triblock copolymers are usually present in an amount up to about 50 parts per 100 parts of polyphenylene ether.

Provided the necessity for intimate blending is strictly observed, the order of blending may be varied. It is often found advantageous to employ an extruder which has at least two ports for introduction of ingredients, one such port being downstream from the other. The capped polyphenylene ether and at least a portion of the impact modifier are introduced through the first port and extruded. This portion of the extruder is often preferably vacuum vented.

The polyamide and any additional impact modifier are introduced through the downstream port and extrusion is continued, preferably at a lower temperature to minimize degradation of the impact modifier. By this method, optimum dispersion may be achieved, with either polyphenylene ether or polyamide being the continuous phase depending on proportion and method of blending.

The principal reaction which takes place between the epoxytriazine-capped polyphenylene ether and a polyamide generally involves amine end groups of the latter, which are highly nucleophilic and open the epoxide rings to form amino alcohol groups. Thus, a preferred embodiment of the invention is compositions comprising polyphenylene ether-polyamide copolymers comprising molecules containing at least one polyphenylene ether-polyamide linkage of the formula

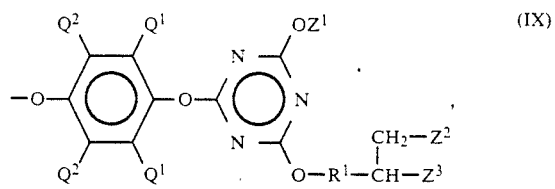

wherein $Q^1$, $Q^2$ and $R^1$ are as previously defined; $Z^1$ is an alkyl, cycloalkyl or aromatic radical (most often lower alkyl or aromatic hydrocarbon) or

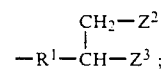

and $Z^2$ is OH and $Z^3$ is —NH—, or $Z^2$ is —NH— and $Z^3$ is OH.

Another possible reaction is between carboxylic acid end groups of the polyamide and the epoxy groups of the capped polyphenylene ether. Thus, the compositions of the invention are not limited to compounds containing linkages of formula IX but may include compounds with linkages of similar structures containing carboxylate moieties replacing the amino moieties of $Z^2$ or $Z^3$.

The proportions of polyphenylene ether and other polymer employed for the preparation of the compositions of this invention are not critical; they may be widely varied to provide compositions having the desired properties. Most often, each polymer is employed in an amount in the range of about 5–95%, preferably about 30–70%, of the composition by weight.

In addition to polyphenylene ether-polyamide copolymer, the compositions of this invention also contain unreacted polyphenylene ether. This will include any polyphenylene ether molecules having only hydrogen bonded end groups (i.e., the aminoalkyl-substituted end groups of formula IV), as well as other polyphenylene ether which is unfunctionalized as a result of incomplete capping or which is functionalized but fails to react with polyamide. Said compositions may also contain unreacted polyamide. In any event, molded parts produced from said compositions are generally ductile and have higher impact strengths than those produced from simple polyphenylene ether-polyamide blends, which are incompatible and often exhibit brittleness or delamination as previously described.

Experimental data suggest that certain other factors are of importance in preparing compositions of maximum impact strength. One of these is the proportion of chlorine in the epoxytriazine-capped polyphenylene ether. Compositions of this invention prepared from high chlorine capped polyphenylene ethers, obtained by the solution method previously described, often have lower impact strengths than those prepared from the low chlorine materials obtained by the interfacial method.

Another factor is the proportion of unneutralized amino nitrogen in the polyphenylene ether. High proportions may cause side reactions, including opening of epoxide rings, displacement of epoxide groups from the cyanurate moiety and cleavage of ester linkages. Such side reactions can be minimized by vacuum venting the polyphenylene ether and/or the composition of this invention as previously described. A third factor is the molecular structure of the copolymer, which may vary with the molecular structure of the capping agent used (BGCC or MGCC as contrasted with DGCC) and its proportion.

It also appears that compositions containing "high chlorine" capped polyphenylene ethers have a greater tendency toward ductility and high impact strength when a polyphenylene ether containing a low proportion of unneutralized amino nitrogen is employed, while the opposite is true for "low chlorine" materials. The reason for this is not presently understood.

There may also be present in the compositions of this invention conventional ingredients such as fillers, flame retardants, pigments, dyes, stabilizers, anti-static agents, crystallization aids, mold release agents and the like, as well as resinous components not previously discussed.

The invention is illustrated by the following examples. All parts and percentages are by weight. The impact modifier used in each example, unless otherwise specified, was a commercially available triblock copolymer with polystyrene end blocks having weight average molecular weights of 29,000 and a hydrogenated butadiene midblock having a weight average molecular weight of 116,000.

EXAMPLES 26-28

Mixtures of 49% epoxytriazine-capped polyphenylene ether, 41% of a commercially available polyamide-66 and 10% impact modifier were dry blended and extruded on a 20-mm. counterrotating, non-intermeshing twin screw extruder, at temperatures from 120° C. to 290° C. or 320° C. The extrudates were quenched in water, pelletized, dried for 2-4 hours at 100°-120° C. and molded into test specimens which were tested for notched Izod impact strength and tensile properties (ASTM procedures D256 and D638, respectively) and heat distortion temperature at 0.455 MPa. (ASTM procedure D648). The results are given in Table III. No delamination was observed.

TABLE III

|  | Example | | |
|---|---|---|---|
|  | 26 | 27 | 28 |
| Polyphenylene ether, % (based on total polyphenylene ether): | | | |
| Ex. 24 | 100 | 100 | 50 |
| PPE | — | — | 50 |
| Max. extrusion temperature, °C. | 290 | 320 | 290 |
| Izod impact strength, joules/m. | 342 | 272 | 246 |
| Tensile strength, MPa.: | | | |
| At yield | 55.6 | 55.7 | 51.2 |
| At break | 61.3 | 60.1 | 54.9 |
| Tensile elongation, % | 146 | 141 | 115 |
| Heat distortion temp., °C. | 187 | 197 | 188 |

EXAMPLE 29

A mixture of 49% of the epoxytriazine-capped polyphenylene ether of Example 18, 41% of the polyamide used in Examples 26-28 and 10% of a commercially available diblock copolymer with polystyrene and hydrogenated butadiene blocks, having a weight average molecular weight of about 164,000, was dry blended, extruded in a 28-mm. corotating, intermeshing twin screw extruder at temperatures from 150° C. to 260° C. using a screw having two sections of kneading block elements, and molded into test specimens which were tested as described in Examples 26-28. The test results were as follows:

Izod impact strength - 678 joules/m.
Tensile strength at yield - 52.1 MPa.
Tensile strength at break - 58.7 MPa.
Tensile elongation - 139%
Heat distortion temperature - 188° C.
No delamination was observed.

The improved impact strength of this composition as compared with the compositions of Examples 26-28 is believed to be primarily the result of more intimate mixing, although the employment of a different epoxytriazine-capped polyphenylene ether and impact modifier may have had some effect.

EXAMPLES 30-31

The epoxytriazine-capped polyphenylene ethers employed in these examples were MGCC-capped products similar to that of Example 25, but prepared employing 3.7% or 5% MGCC.

Compositions were prepared from 49% epoxytriazine-capped polyphenylene ether, 41% nylon-6 (Example 30) or nylon-66 (Example 31) and 10% impact modifier, by the procedure of Example 26. The relevant parameters and properties are listed in Table IV. No delamination was observed.

TABLE IV

|  | Example | |
|---|---|---|
|  | 30 | 31 |
| MGCC, % based on PPE | 3.7 | 5.0 |
| Izod impact strength, joules/m. | 272 | 822 |
| Tensile strength, MPa.: | | |
| At yield | 52.8 | 54.0 |
| At break | 60.5 | 64.8 |
| Tensile elongation, % | 191 | 186 |
| Heat distortion temp., °C. | 127 | — |

EXAMPLE 32

Following the procedure of Example 31, a blend was prepared from 49% polyphenylene ether capped with MGCC at a reactant level of 3.5%, 10% impact modifier and 41% of a commercially available amorphous polyamide prepared from hexamethylenediamine and a 67:33 mixture of isophthalic and terephthalic acids. It had an Izod impact strength of 85 joules/m., as compared to 21 joules/m. for a control sample in which PPE was substituted for the capped polyphenylene ether. Moreover, the control exhibited delamination which was not observed in the composition of the invention.

What is claimed is:

1. A method for preparing a composition comprising polyphenylene ether copolymers which comprises effecting reaction under intimate blending conditions between an epoxytriazine-capped polyphenylene ether and at least one other polymer containing amine end groups.

2. A method according to claim 1 wherein the other polymer is a polyamide.

3. A method according to claim 1 wherein the polyphenylene ether comprises a plurality of structural units having the formula

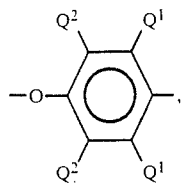

(III)

wherein each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

4. A method according to claim 3 wherein the polyphenylene ether is a poly(2,6-dimethyl-1,4-phenylene 5. A method according to claim 4 wherein the polyamide is a polyamide-6 or a polyamide-66.

6. A method according to claim 4 wherein blending is effected by kneading.

7. A composition prepared by the method of claim 1.

8. A composition prepared by the method of claim 4.

9. A composition prepared by the method of claim 5.

* * * * *